Figure 1:
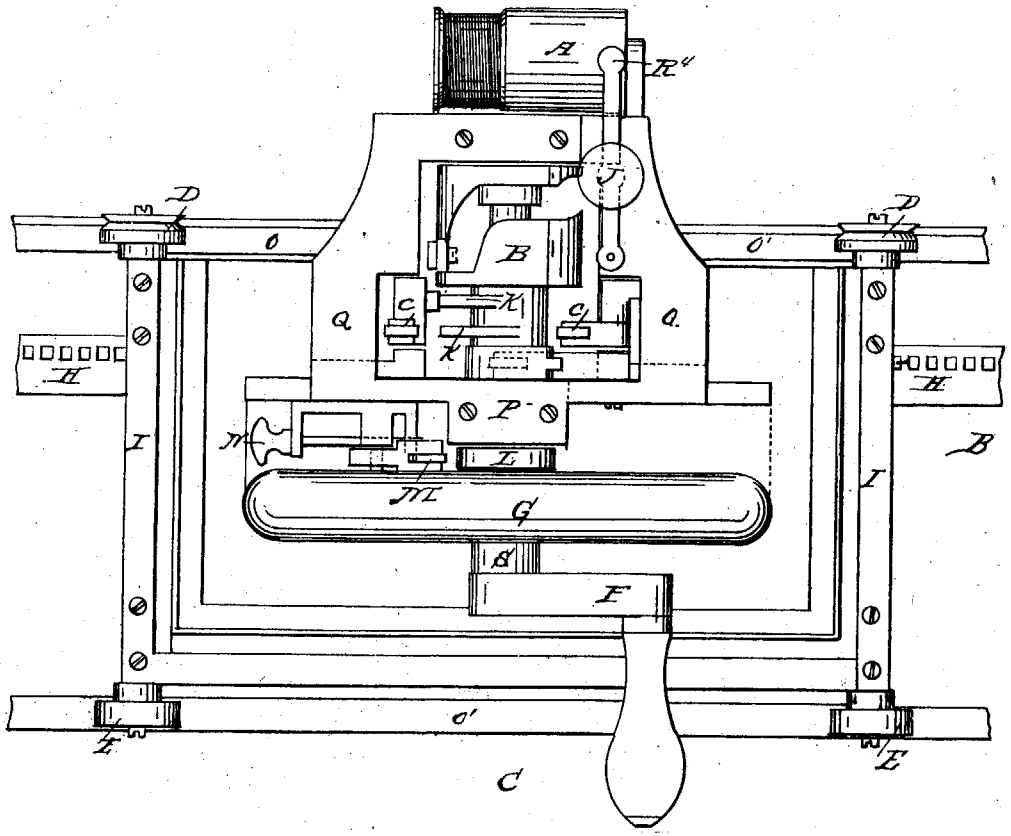

4 Sheets—Sheet 1.

J. A. BRADSHAW.

Sewing Machine.

No. 453.

Reissued April 14, 1857.

N. PETERS, Photo-Lithographer, Washington, D. C.

J. A. BRADSHAW.
Sewing Machine.
No. 453.
Reissued April 14, 1857.
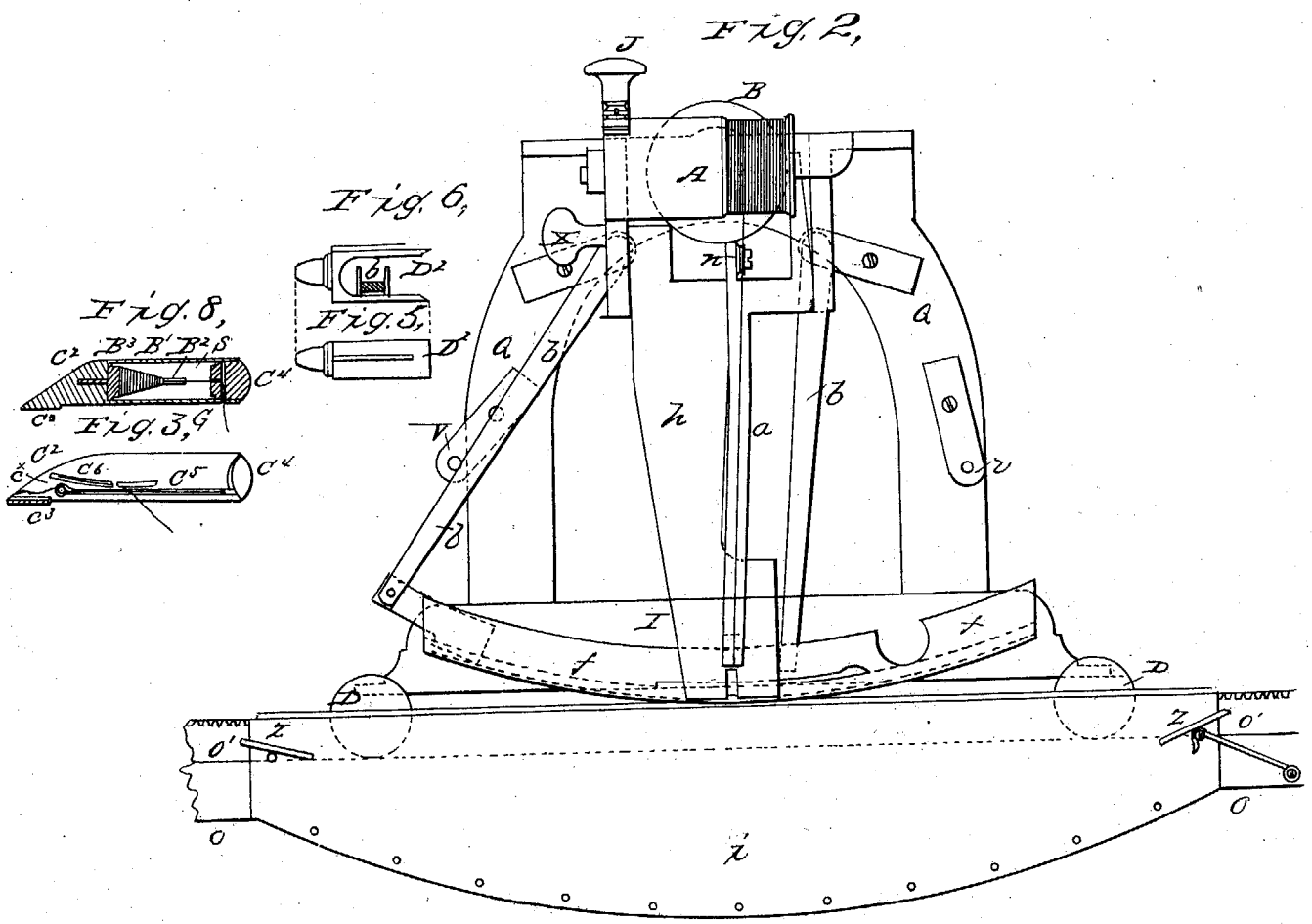
N. PETERS, Photo-Lithographer, Washington, D. C.

4 Sheets—Sheet 3.
J. A. BRADSHAW.
Sewing Machine.
No. 453. Reissued April 14, 1857.
Fig. 3,
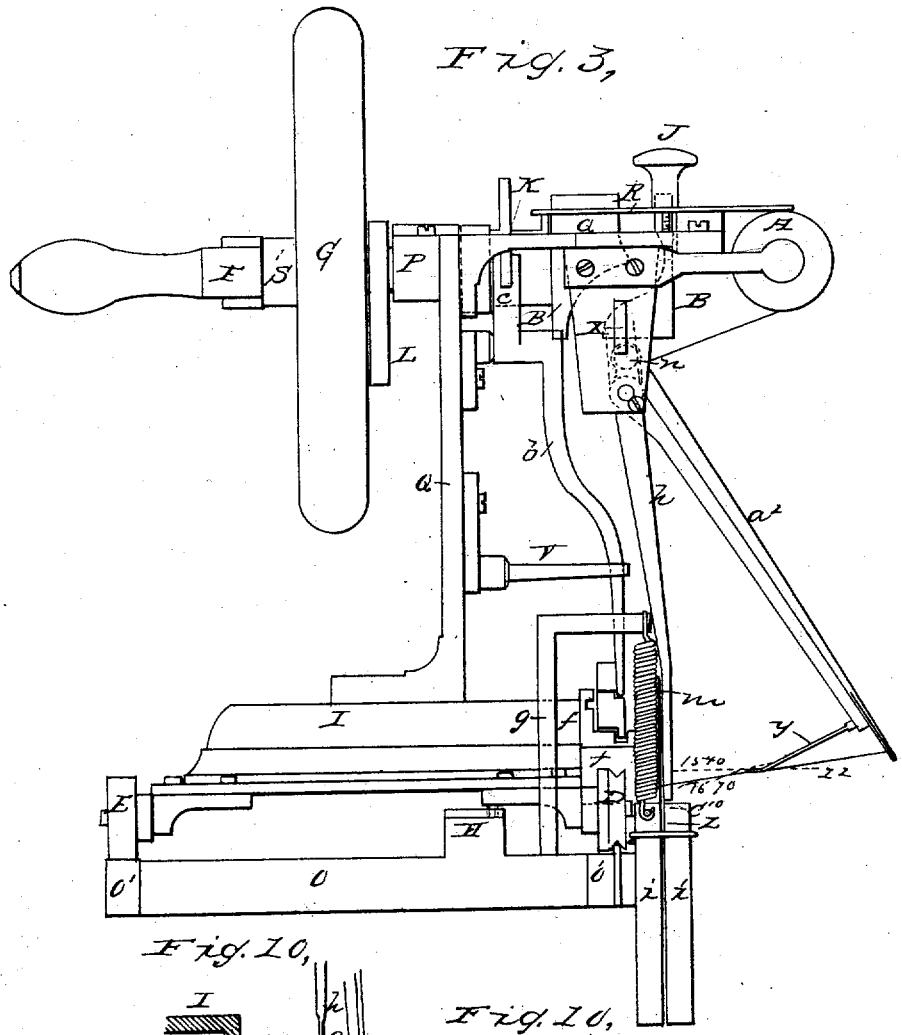
Fig. 10,
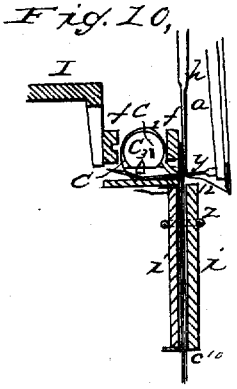
Fig. 10,
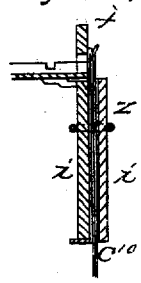
N. PETERS, Photo-Lithographer, Washington, D. C.

J. A. BRADSHAW.
Sewing Machine.
No. 453. Reissued April 14, 1857.
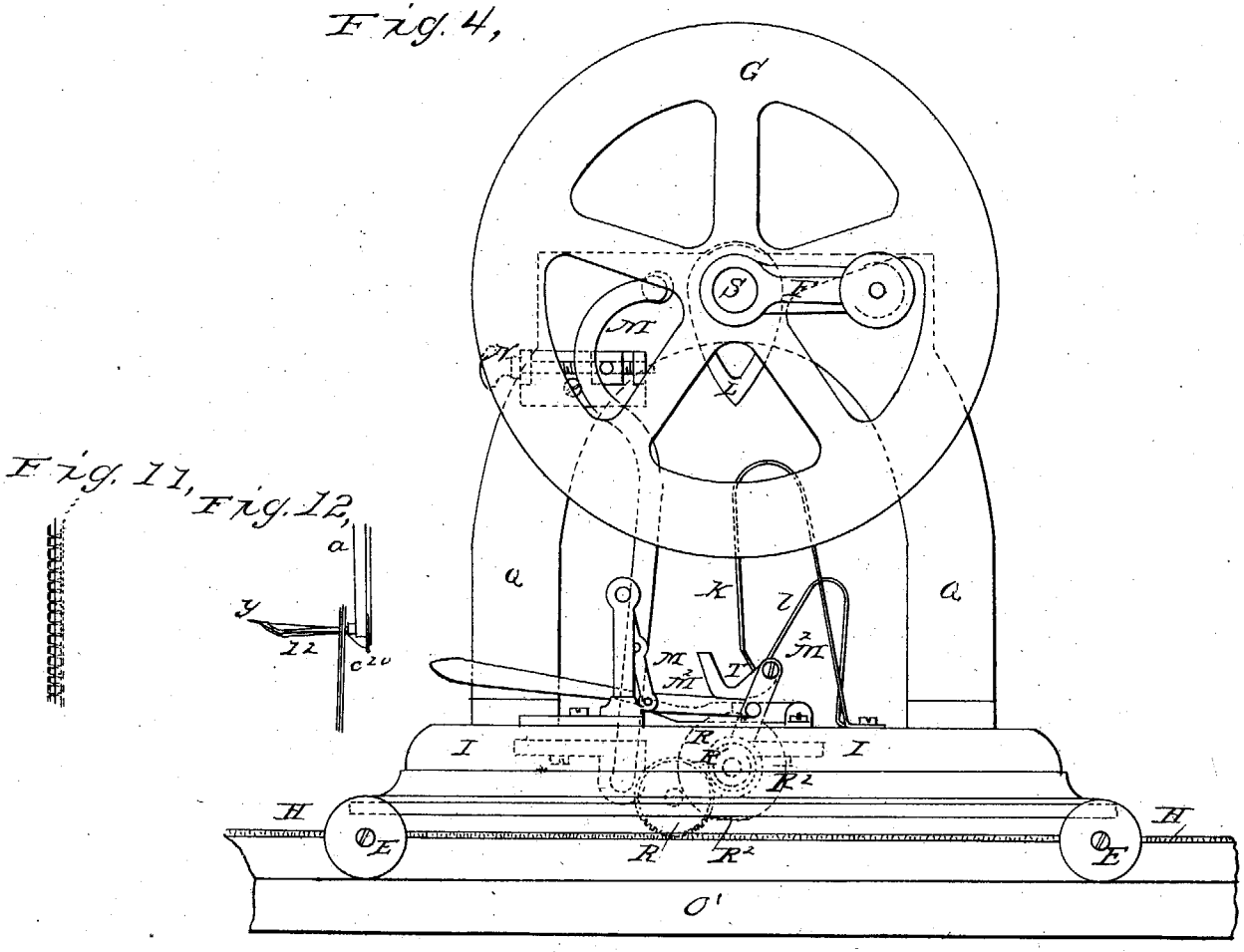
N. PETERS, Photo-Lithographer, Washington, D. C.

UNITED STATES PATENT OFFICE.

JOHN A. BRADSHAW, OF LOWELL, MASS., ASSIGNOR TO JOS. P. MARTIN, OF PHILADELPHIA, PENNSYLVANIA.

IMPROVEMENT IN SEWING-MACHINES.

Specification forming part of Letters Patent No. 5,942, dated November 28, 1848; Reissue No. 453, dated April 14, 1857.

*To all whom it may concern:*

Be it known that JOHN A. BRADSHAW, of the town of Lowell, in the county of Middlesex and State of Massachusetts, has invented certain new and useful Improvements in the Machine for Sewing Seams in Cloth and other Substances; and I do hereby declare that the following is a full, clear, and exact description of the construction and operation of the same, reference being had to the annexed drawings, making a part of this specification, in which—

Figure 1 is a top view of the machine. Fig. 2 is an elevation of the front or side A, Fig. 1. Fig. 3 is an elevation of the end B, Fig. 1. Fig. 4 is an elevation of the back or side C, Fig. 1. Fig. 5 is a plan of the driver. Fig. 6 is a section of the driver. Fig. 7 is a perspective view of the bobbin-case. Fig. 8 is a vertical longitudinal section of the bobbin-case and the helical spring and perforated rubber plate, showing the manner in which the thread is wound upon the bobbin and how it passes through between the perforated rubber and the plug to the outside of the case. Fig. 9 is a section of the clamp for holding the cloth, showing the manner of suspending it to the box. Fig. 10 is a section showing the flying bobbin-case in the act of passing through the loop of the first thread at the moment after the needle has been drawn back slightly to form the loop. Fig. 11 shows the manner of forming the loop of the seam. Fig. 12 represents the needle passed through the cloth with the thread to form a stitch.

The letters of reference indicate the same parts in the different figures wherever they occur.

The following is a description of the construction and operation of the machine.

The platform O, on which the carriage is placed and to which the clamp *i* is attached, the carriage I with its frame-work to support the operative portion of the machine, the cam-shaft S′ with the cams B K L, &c., the balance-wheel G, the picker-staves *b b*, and drivers $D^2$, the needle-arm *a*, the system of compound straight and bent levers M, &c., with the click T, ratchet-wheel $R^2$, cogged pinions R R′, and rack H, by the operation of which the carriage is moved simultaneously with the formation of the seam, are all constructed and operated in a manner substantially the same as the corresponding parts of the machine described in Elias Howe, Jr.'s patent of September 10, 1846. A particular description of them is therefore unnecessary, and I shall merely refer to them in describing the improvements.

O is the base or platform, having a rack, H, running longitudinally along its upper surface parallel to the guides or ways O′, on which the carriage moves.

I is the carriage upon which the standards Q Q are erected, which support the cam-shaft S′, with its cam B, which operates the needle-arm *a*, and cams K K, that move the vibrating picker staves or arm *b b*, and the cam L, which operates the bent lever M, and with it the system of compound levers M′ $M^2$ $M^3$, connected together by joint-pins, which, by means of a dog, T, turn the ratchet-wheel $R^2$, and the cog-wheel R′, which is secured to the ratchet-wheel shaft, and which gears into the cog-wheel R, which meshes into the rack H. These wheels operated by the aforesaid levers and cam, move the carriage along upon the ways O′ every time the needle is withdrawn from the cloth a distance equal to the length that the next stitch is required to be made. The cloth, being held between the clamp-boards, and these being attached to the way O′, which is stationary, remains in the same position, while the machine carrying the needle and thread moves along by the side of the seam as fast as it is formed. The length of the stitch is varied by turning the thumb-screw N, which brings the lever M more or less within the scope of the action of the cam L, which moves it as in the Howe machine.

The needle (which constitutes one of the improvements) is of the form seen at *y*, and is attached to the vibrating lever *a*, by which, in the formation of each stitch, it is caused to pierce and protrude through the cloth, carrying with it the bend or loop of the first thread. The needle has two angular bends, as represented. Through the angle nearest to the point the eye is made, through which, from the under side, the thread from the bobbin A is passed, as represented by the line 12, and from thence to the cloth. The needle is made of this shape in order that while it is passing through the cloth a loop or space for the bobbin-case to pass through may be formed between the thread which passes in a straight line from the eye back to the cloth $c^{10}$, where the stitch is being formed, as represented in Fig. 12, the thread forming the base or longest side of an obtuse-angled triangle when extended or stretched by the entrance of the needle the full extent to which it is designed to enter, said portion of the thread being made to bow upward and form a loop directly in the path of the bobbin-case, the needle being withdrawn a short distance, and then stopped for an instant of time that the bobbin-case may be passed through the loop, its beak or pointed end entering said loop without obstruction, passing between the needle and the thread, drawing out the slack of the latter to form the loop large enough that it may pass through with facility, which gives out the second thread which is to be drawn into the cloth by the said loop of the first thread on the withdrawal of the needle from the cloth, as seen in Fig. 10. Every time the needle pierces the cloth the vibrating clamp *n* is made to press the cloth firmly against the side of the curved trough or segment-box until after the needle is again withdrawn. This prevents any movement of the cloth during the formation of the stitch. The portion of the needle from the arm *a* to the first angle is made straight, from thence it is bent upward, forming an angle of about one hundred and fifty-four degrees with the first-named portion. It is then bent downward at the point, forming an angle of about one hundred and sixty-seven degrees with the middle or last-named position. This shape of needle, when operated in the manner above described, will form the loop in the transverse thread without the use of the lifting-pin used in the Howe machine.

The case $C^2$, Figs. 7 and 8, of the flying-bobbin is made of any suitable metal and of convenient dimensions. The exterior form of the body of the case is that of a segment of a cylinder larger than a half-cylinder in its transverse section, while its interior is cylindrical. Its beak or front end is semi-conical in shape, and solid, having a tongue, $C^3$, upon its under side corresponding to the groove in the bottom of the guide-trough or segment-box *f*, in which it runs. The back end of the case is closed up by a solid metallic plug, $C^4$, screwed therein. Within the case is placed a bobbin, B′, to hold the second thread with which the seam is made. Upon the spindle $B^2$ of the bobbin is secured a collar, $B^3$, near its large end, which collar corresponds in diameter with the interior of the case. The large end of the spindle, which projects beyond the collar of the bobbin, fits into a hole made in the front end of the case. The thread is wound upon the spindle of the bobbin in the form of a cone, as represented in Fig. 8, the apex of which is placed toward the rear end of the case, so that it may be easily unwound by being drawn in a line with the spindle.

Over the spindle, and fitting into a groove formed upon the collar thereof, is placed a helical spring, *s*, Fig. 8, which fills the interior of the case $C^2$ from the collar $B^2$ to the plug $C^4$ in the rear. Into the rear end of the helix a round collar, G′, is inserted. It is perforated in the center with a small hole for the thread or silk to pass, the diameter of the larger portion of the collar corresponding with the diameter of the inside of the case. The thread from the bobbin passes through the hole in the center of the collar and out between the collar and plug through an aperture in the side of the case to the exterior thereof. The collar, being pressed upon by the spring, acts as a friction-rubber to prevent the thread from being drawn from the bobbin without being subjected to a sufficient degree of tension. The pressure of the rubber may be increased by screwing in the plug, which presses the collar harder against the spring, and in this manner the thread may be drawn with any degree of tension that it will bear. The annexed drawings contain different means of producing the same effect—such as holes or apertures in the case and bars through and around which the thread is passed, the friction and consequent tension of the thread being regulated by the number of turns taken. These contrivances may be used separately or combined with each other.

The shuttle heretofore in use in the Howe machine had a spring bearing with a pressure upon the bobbin, and acting as a friction-brake thereto for the purpose of preventing more thread from running off than was necessary to form the loop, but contained no means of regulating the tension upon its thread to suit the various conditions required by the thread used or the material to be sewed; but recourse was had to complicated contrivances not immediately connected with the bobbin-case, one of which seized and held the thread in a clip at certain intervals, while the other tightened the stitch after the shuttle had passed through the loop.

By placing the means by which the requisite tension is regulated within, upon, or so as to form part of the bobbin-case, the necessity of using the above-mentioned independent apparatus is entirely superceded, and important advantages are secured—such as simplicity and consequent economy in construction, greater certainty in operation, and less liability to derangement from wear of parts subjected to rapid motion.

The stitches are formed, as in the Howe machine, by the thread from the bobbin-case $C^2$ being looped around the thread of the needle and drawn together with a tension corresponding to the force with which the friction-rubbers or the other appliances before mentioned act upon the thread. The manner in which the threads are looped together in the seam will appear more plainly by reference being had to Fig. 11, in which the dotted line represents the loops made by the first thread and the black line those made by the second.

The clamp for holding the cloth is composed of two boards or plates, *i i*, lined on their sides next to the article being held with cloth or other suitable substance, and provided with dowel-pins to keep them in their proper relative position. The cloth or other article to be sewed is placed between the said clamp-boards, which are held with firmness together by the springs L, which may be of the form represented in Fig. 2, or of any form more suitable. This clamp is suspended to the under side of the segment-box or guide-trough by means of a flange or lip, fastened to the upper edge of the inner clamp-board, which plate is hooked upon a pin inserted into the box or trough, and is prevented from moving longitudinally by a hook, which is attached by one of its ends to the way or track O′, having the other end inserted into an aperture in the clamp-board. The ends of the clamp are at liberty to move vertically, for the purpose of sewing angular and curved seams. The end of the clamp may be suspended to a fixed bar or post by a spring such as that represented at *m*, Fig. 3, or by any suitable means. One edge of the clamp is made straight, for sewing straight seams. The other edge is made curved, for sewing curved seams. The curved edge is provided with a flange attached to the inner half of the clamp in the same manner as described above for the straight edge. When this edge is used, the position of the clamp will be inverted. The importance of this clamp will be apparent when it is considered with what regularity and certainty seams may be sewed when the pieces of cloth are once clamped, how easily they can be raised and lowered at either end, turned, and adjusted to the needle without any danger of separating the edges of the cloth in sewing various descriptions of curved seams, and with what facility pieces of cloth can be clamped without the use of basting-thread or basting pins or plates, in addition to the advantages heretofore enumerated.

Having thus fully described the machine, what is claimed as new, and which I desire to secure by Letters Patent, is—

1. Regulating the tension of the thread after it has been unwound from the bobbin by means of apertures, and bars within, upon, or through the thread-case, either separate or combined, or by any other equivalent means, when said means are within, upon, or form part of the bobbin-case itself, for the purpose specified.

2. Springs or screws bearing upon the bobbin, separately considered, are not claimed; but what is claimed, secondly, is, regulating the tension of the shuttle-thread in the act of leaving the bobbin by a combination of one or more screws with a spring or any yielding or elastic substances, or any combination of equivalent devices producing the same effect.

In testimony whereof I have signed my name to this specification this 26th day of January, 1857.

JOSEPH P. MARTIN,
*Assignee of John A. Bradshaw.*

In presence of—
JNO. B. KENNEY,
CHARLES THOMPSON.